United States Patent
Jeon et al.

(10) Patent No.: US 9,189,718 B2
(45) Date of Patent: Nov. 17, 2015

(54) POWER SUPPLY CONTROL METHOD FOR RADIO-FREQUENCY IDENTIFICATION READER IN MOBILE TERMINAL

(75) Inventors: Jea Sic Jeon, Seoul (KR); Man Hee Kim, Seoul (KR); O Hyon Kwon, Seoul (KR)

(73) Assignee: SK PLANET CO., LTD. (KR)

( * ) Notice: Subject to any disclaimer, the term of this patent is extended or adjusted under 35 U.S.C. 154(b) by 938 days.

(21) Appl. No.: 12/527,833

(22) PCT Filed: Feb. 21, 2008

(86) PCT No.: PCT/KR2008/001031
§ 371 (c)(1),
(2), (4) Date: Aug. 19, 2009

(87) PCT Pub. No.: WO2008/103001
PCT Pub. Date: Aug. 28, 2008

(65) Prior Publication Data
US 2010/0117805 A1    May 13, 2010

(30) Foreign Application Priority Data

Feb. 21, 2007 (KR) .......................... 10-2007-0017223

(51) Int. Cl.
*G06K 17/00* (2006.01)
*G06K 7/00* (2006.01)
*G06K 7/10* (2006.01)

(52) U.S. Cl.
CPC .............. *G06K 17/00* (2013.01); *G06K 7/0008* (2013.01); *G06K 7/10207* (2013.01)

(58) Field of Classification Search
CPC ... G06Q 20/40; G06Q 30/0601; G06Q 20/20; H04M 1/7253; H04W 12/08
USPC .................. 340/1.1, 10.1–10.6, 572.1–572.9; 455/466, 480, 556.1, 343.5
See application file for complete search history.

(56) References Cited

U.S. PATENT DOCUMENTS

| 5,747,786 A | 5/1998 | Cargin, Jr. et al. |
| 7,003,316 B1 | 2/2006 | Elias et al. |

(Continued)

FOREIGN PATENT DOCUMENTS

| KR | 10-0261064 | 4/2000 |
| WO | 2005/069195 | 7/2005 |
| WO | 2005069195 | 7/2005 |

OTHER PUBLICATIONS

Penttila, K. et al. "Use and interface definition of mobile RFID reader integrated in a smart phone" In: Proceedings of the Ninth International Symposium on Consumer Electronics, 2005. (ISCE 2005). Edited by R.S. Bradbeer et al. Hong Kong: IEEE, 2005, pp. 353-358.

(Continued)

*Primary Examiner* — James Yang
(74) *Attorney, Agent, or Firm* — Baker & Hostetler LLP

(57) ABSTRACT

A power control method for an RFID reader in a mobile terminal includes the steps of: checking a driving mode of a display in a standby mode where no power is supplied to the RFID reader; if the driving mode of the display is a sleep mode, maintaining the RFID reader in the standby mode, and if the driving mode of the display is an operation mode, checking an RFID menu interface; and if the RFID menu interface has no RFID automatic detection function settled therein, maintaining the RFID reader in the standby mode, and if the RFID menu interface has an RFID automatic detection function settled therein, supplying power to the RFID reader so that the RFID reader is switched to a read mode.

4 Claims, 6 Drawing Sheets

(56) References Cited

U.S. PATENT DOCUMENTS

| | | |
|---|---|---|
| 7,145,437 B2 | 12/2006 | Jalkanen et al. |
| 8,115,595 B2 * | 2/2012 | Ryoo et al. ............ G06K 7/0008 235/375 |
| 2005/0070339 A1 * | 3/2005 | Kim .................. H04W 52/0258 455/572 |
| 2005/0164633 A1 * | 7/2005 | Linjama et al. ...... H04B 1/1615 455/41.2 |
| 2005/0282588 A1 | 12/2005 | Linjama et al. |

OTHER PUBLICATIONS

European search report dated Jan. 25, 2010.

* cited by examiner

POWER SUPPLY CONTROL METHOD FOR RADIO-FREQUENCY IDENTIFICATION READER IN MOBILE TERMINAL

TECHNICAL FIELD

The present invention relates to power control of a mobile terminal, and more particularly, to a method for adaptively controlling power supply of a mobile terminal incorporating an RFID (radio frequency identification) reader therein.

BACKGROUND ART

As well-known in the art, RFID is an electronic device which is attached to or incorporated into an object, a living body and the like. Generally, the RFID includes an electronic chip (ubiquitous chip) for providing a computing function, an antenna for a wireless communication, and a sensor for detecting an ambient environment.

Recently, there have rapidly been proposed lots of models using a mobile terminal in which an RFID reader is incorporated therein. Such models read RFID data received from an RF tag attached to (or incorporated into) an object through the use of the mobile terminal, and transmit the read RFID data to a server for information management or the like, which is a host system at a remote location, to thereby provide desired services.

FIG. 1 is a diagram showing an example in which a mobile communication system includes a mobile terminal having an RFID reader.

As shown, the mobile communication system includes an object 102 with an RFID tag attached thereto, a mobile terminal 104, a mobile communication network base station 106, a data network 108, and an information management server 110.

The mobile terminal 104, which incorporates an RFID reader therein, receives an RF signal from the RFID tag attached to the object 102 to read RFID data from the RF signal and modulates the RFID data into a signal suitable for wireless transmission. The modulated signal is then wirelessly transmitted to the information management server 110 via a mobile communication network, i.e., the mobile communication network base station 106 and the data network 108. In addition, the mobile terminal 104 transmits, to the RFID tag attached to the object 102, the RFID data provided from the information management server 110 via the data network 108 and the mobile communication base station 106, thereby allowing new RFID data to be written in the RFID tag of the object 102 or to update the RFID data written in the RFID tag of the object 102.

The information management server 110 serves to send and receive RFID data to and from the mobile terminal 104 via the data network 108 and the mobile communication base station 106. That is, the information management server 110 receives RFID data via the mobile communication network base station 106 and the data network 108 and transmits the RFID data to a subscriber address (e.g., IP address) transmitted along with the RFID data, or receives RFID data transmitted from a subscriber address and transmits it to the mobile terminal 104 via the data network 108 and the mobile communication network base station 106.

As described above, in order to read an RF signal from the RFID tag attached to the object by using the mobile terminal incorporating an RFID reader, in other words, in order for the mobile terminal to read an RFID signal, a user selects such a corresponding function as the RFID read mode, on a menu screen through an interface (multi-stage interface) having a tree structure, to make the mobile terminal be switched to the RFID read mode and then reads the RF signal from the RFID tag attached to the object. In this connection, the RFID read mode indicates a state where power is being supplied to the RFID reader. In modes other than the RFID read mode, no power is supplied to the RFID reader for preventing unnecessary power consumption.

However, since the above-described method switches the mobile terminal to the RFID read mode through the multi-stage interface on the menu screen, it has a problem that there is an inconvenience of use due to a user's frequent operation. As a result, this problem causes dissatisfaction of consumers of mobile terminal users on services.

To solve this problem of the prior art, a method for switching a mobile terminal to an RFID read mode by using a preset hotkey may be considered. However, this method cannot be a fundamental solution when considering the fact that it is difficult in reality to design a mobile terminal having a lot of functions such that all the functions can be accessed by respective hotkeys.

As another measure for solving the above-described problem of the prior art, a method for always supplying power to an RFID reader built in a mobile terminal, i.e., a method for allowing a mobile terminal to be continuously maintained in the RFID read mode, can be taken into account. This method, however, has another problem that power consumption is unnecessarily increased.

To overcome such problems of the prior art, "A mobile terminal having an adaptive power control function and a control method thereof" has been proposed in Korean Patent Application No. 10-2006-26072. The power control method for a mobile terminal disclosed in this patent application will be discussed below.

First of all, it is checked whether a mobile terminal is in a folder open state, a flip open state, or a slid open state to identify whether the terminal is in an operating mode or in a standby mode. When the mobile terminal is in the standby mode, power supply to the RFID reader is interrupted, and when the mobile terminal is in the operating mode, power is supplied to the RFID reader.

In this patent application, when it is desired to switch the mobile terminal having an RFID reader to the RFID read mode, such switching is not implemented in a complicated multi-stage menu interface, and thus, the convenience of services utilizing RFID can be greatly increased. Moreover, when a folder, a flip, or a slide is in a closed state, power supply to the RFID chip is interrupted, thereby reducing unnecessary power consumption required for executing the RFID read mode.

However, in this patent application, the procedure of checking whether the mobile terminal is in a folder open state, a flip open state, or a slid open state is performed during automatically switching the RFID reader from the standby mode to the read mode. Therefore, there is a lack of unified power control because different standards are applied depending on the design characteristics of the mobile terminal.

Another defect is that there is no control procedure for power saving after the switching of the RFID reader from the standby mode to the read mode.

DISCLOSURE OF INVENTION

Technical Problem

It is, therefore, an object of the present invention to provide a power control method for an RFID reader in a mobile terminal, which can provide a unified power control scheme regardless of the design characteristics of the mobile terminal while preventing deterioration of power saving efficiency, by automatically switching the RFID reader from a standby mode to a read mode based on the result of checking a display state of the mobile terminal.

Another object of the present invention is to provide a power control method for an RFID reader in a mobile terminal, which can improve power saving efficiency by providing a control procedure for power saving after switching the RFID reader from a standby mode to a read mode.

Technical Solution

In accordance with the present invention, there is a power control method for an RFID (radio frequency identification) reader in a mobile terminal, comprising the steps of: checking a driving mode of a display in a standby mode where no power is supplied to the RFID reader; if it is checked that the driving mode of the display is a sleep mode, maintaining in the standby mode of the RFID reader, and if it is checked that the driving mode of the display is an operation mode, checking an RFID menu interface; and if it is checked that the RFID menu interface has no RFID automatic detection function settled therein, maintaining the RFID reader in the standby mode, and if it is checked that the RFID menu interface has an RFID automatic detection function set therein, supplying power to the RFID reader so that the RFID reader is switched to a read mode.

Advantageous Effects

According to the present invention, a unified power control technique is provided regardless of the design characteristics of the mobile terminal, while power saving efficiency is not deteriorated compared to the prior art method.

Furthermore, a control procedure for power saving is provided after an RFID reader is switched from the standby mode to the read mode, thereby improving power saving efficiency.

BEST MODE FOR CARRYING OUT THE INVENTION

Hereinafter, preferred embodiments of the present invention will be described in detail with reference to the accompanying drawings.

Figure 2:
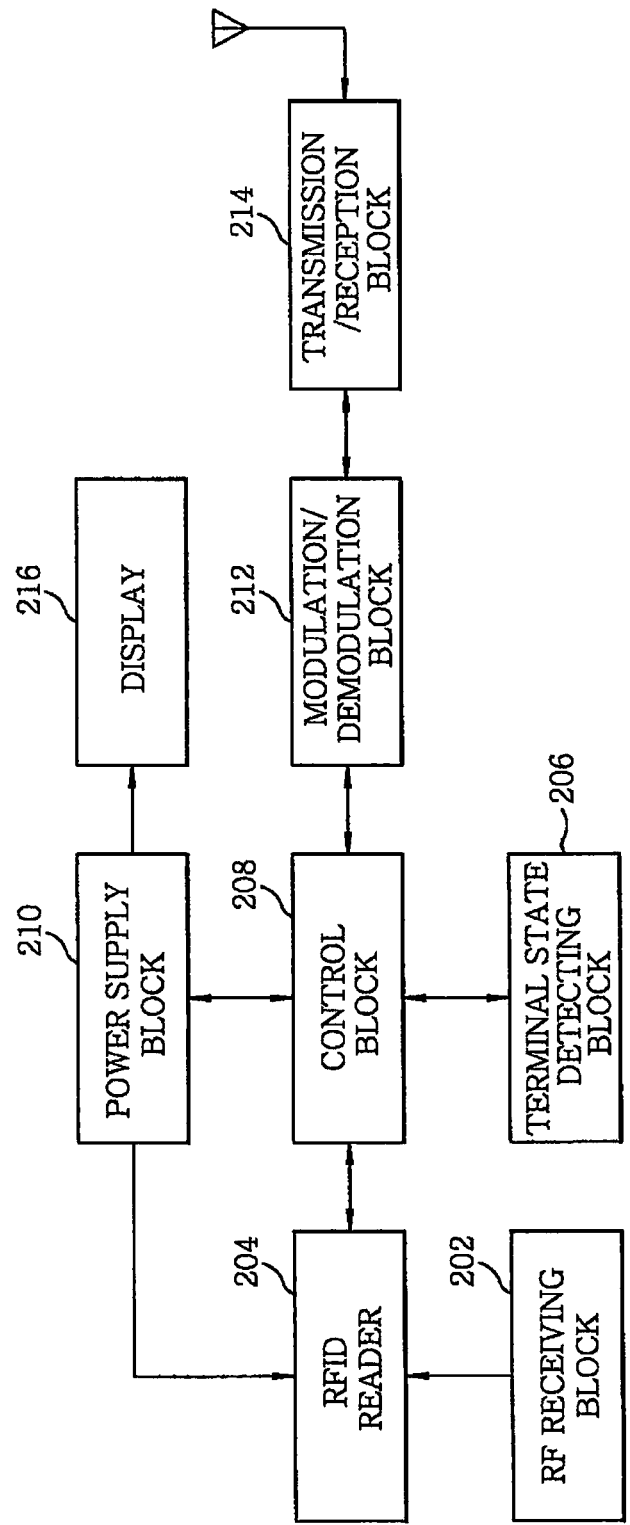
FIG. 2 shows a block diagram of a mobile terminal capable of executing a power control method for an RFID in accordance with the present invention.

FIG. 2 shows a block diagram of a mobile terminal capable of executing a power control method for an RFID in accordance with the present invention.

As shown in FIG. 2, the mobile terminal of the present invention includes an RF receiving block 202, an RFID reader 204, a terminal state detecting block 206, a control block 208, a power supply block 210, a modulation/demodulation block 212, a transmission/reception block 214, and a display 216.

Figure 1:
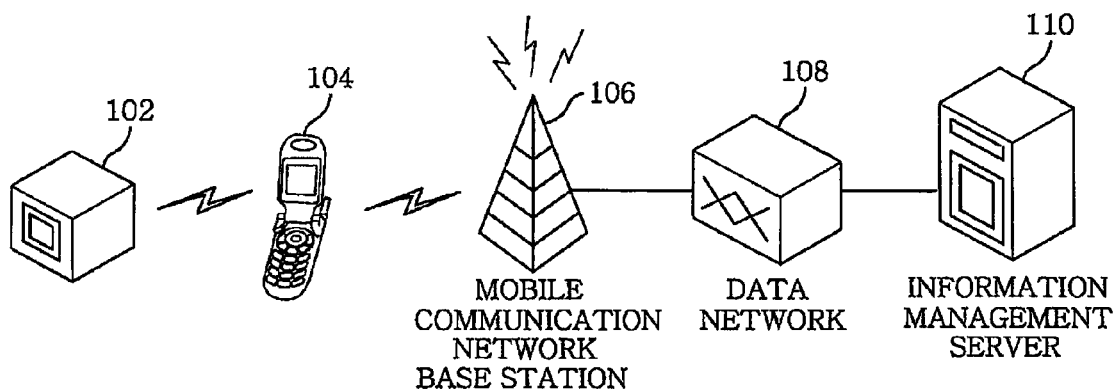
FIG. 1 is a diagram showing an example in which a mobile communication system includes a mobile terminal incorporating an RFID reader.

The RF receiving block 202 receives an RF signal from an RFID tag attached to or incorporated into an object 102 as shown in FIG. 1 by way of an example. To this end, the RF receiving block 202 incorporates an antenna for RFID therein, and extracts RFID data from the received RF signal and transmits the extracted RFID data to the RFID reader 204.

The RFID reader 204 has an application for the processing of RFID data stored in an internal memory thereof. The RFID reader 204 reads out the RFID data transmitted from the RF receiving block 202 and transmits it to the control block 208. Electric power necessary for operation, i.e., reading of RFID data is selectively supplied to the RFID reader 204 from the power supply block 210 in accordance with the present invention.

The terminal state detecting block 206 includes a sensor which detects, for example, the opening of the folder of a folder type mobile terminal, the opening of the flip of a flip type mobile terminal, and the opening (slide up or slide down) of the slide of a slide type mobile terminal. A signal detected by the terminal state detecting block 206 is provided to the control block 208.

The display 216 may be implemented with a liquid crystal display (LCD), for example. Among various driving modes of the display 216, a back-light is turned on in an operation mode, while the back-light is turned off in a sleep mode. The driving mode of the display 216 is switched when the power supply block 210 supplies or interrupts power to the display in response to a display power control signal from the control block 208.

The control block 208 includes, for example, a microprocessor that performs the overall operational control of the mobile terminal, and transmits the RFID data received from the RFID reader 204 to the modulation/demodulation block 212 for transmission to a remote server.

Further, the control block 208 performs the function of determining whether the current state of the mobile terminal is in the operation mode or in the standby mode depending on a detection signal received from the terminal state detecting block 206. In this regard, the operation mode indicates a state where the folder of a folder type mobile terminal, the flip of a flip type mobile terminal, or the slide of a slide type mobile terminal is open, and the standby mode indicates a state where the folder, flip, or slide thereof is closed (i.e., a state capable of receiving phone calls, messages, or the like).

Moreover, the control block 208 switches the display 216 to the operation mode by outputting a display power control signal to the power supply block 210 depending on a display power supply condition, such as the operation or not of a keypad. At this time, the control block 208 also provides an RFID reader power control signal to the power supply block 210, thereby switching the RFID reader 204 from the standby mode to the read mode.

Also, the control block 208 receives various input signals and check results including the checking of an RFID menu interface, the operation mode (including a standby mode or a driving mode) of the mobile terminal, the functions other than RFID reading, the reception or not of an RFID signal, the automatic detection or not of RFID, the completion or not of RFID reading, and so forth, and utilizes them to switch between the standby mode and the read mode of the RFID reader 204. The switching procedure performed between the standby mode and the read mode of the RFID reader 204 under control of the control block 208 will fully be understood from the following description, given with reference to FIGS. 3 to 6.

The power supply block 210 is provided with, for example, a power supply battery and a switching unit for selectively supplying power from the battery to the RFID reader 204. The power supply block 210 selectively supplies power to the display 216 in response to a display power control signal provided from the control block 208, and selectively supplies power to the RFID reader 204 in response to the RFID reader power control signal from the control block 208.

The modulation/demodulation block 212 modulates the RFID data provided from the control block 208 or a user's voice on the phone into a signal suitable for wireless transmission to transmit it to the transmission/reception block 214 having a mobile communication antenna installed therein. In addition, the modulation/demodulation block 212 demodulates a modulated RF signal provided from the transmission/reception block 214 into an original signal before modulation to provide it to the control block 208.

FIGS. 3 to 6 illustrate flowcharts illustrating a method for controlling power of the RFID reader in accordance with various embodiments of the present invention. Now, the power control method for an RFID reader in a mobile terminal in accordance with the present invention will be described in detail below with reference to these flowcharts and the configuration diagram of FIG. 2.

Figure 3:
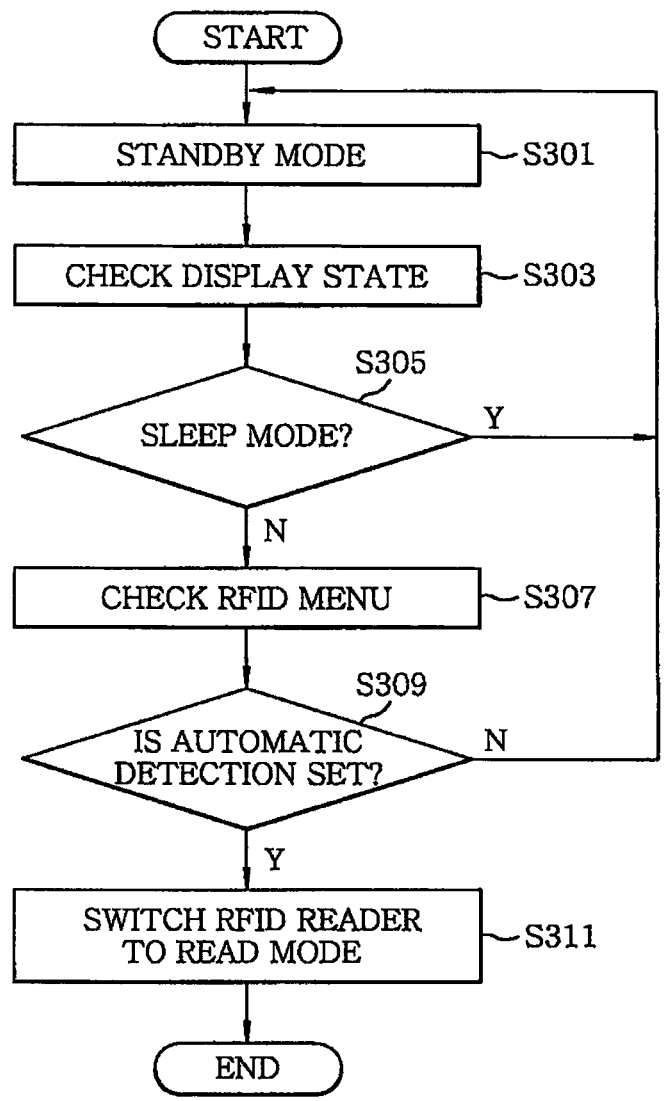
FIG. 3 illustrates a flowchart illustrating a power control method for an RFID reader in accordance with a first embodiment of the present invention.

First, referring to FIG. 3, when the RFID reader 204 is in the standby mode where no power is supplied thereto at step S301, the control block 208 checks the state of the display 216, i.e., the driving mode at step S303.

If it is checked that the driving mode of the display 216 is in a sleep mode where the back-light is turned off at step S305, the standby mode where no power is supplied to the RFID reader 204 is maintained. If, however, it is checked that the driving mode of the display 216 is in the driving mode where the back-light of the display 216 is turned on, the RFID menu interface is checked at step S307.

If it is checked that the RFID menu interface has the RFID automatic detection function set therein at step S309, the control block 208 generates an RFID reader power supply control signal to provide it to the power supply block 210, so that the power supply block 210 supplies power for reading RFID data to the RFID reader 204. Then, the RFID reader 204 is switched from the standby mode to the read mode at step S311, thus performing the procedure of RFID signal reception and RFID data reading.

On the other hand, as a result of checking the RFID menu interface at step S309, if it is checked that the RFID automatic detection function is not set, the RFID reader 204 is maintained in the standby mode.

Figure 4:
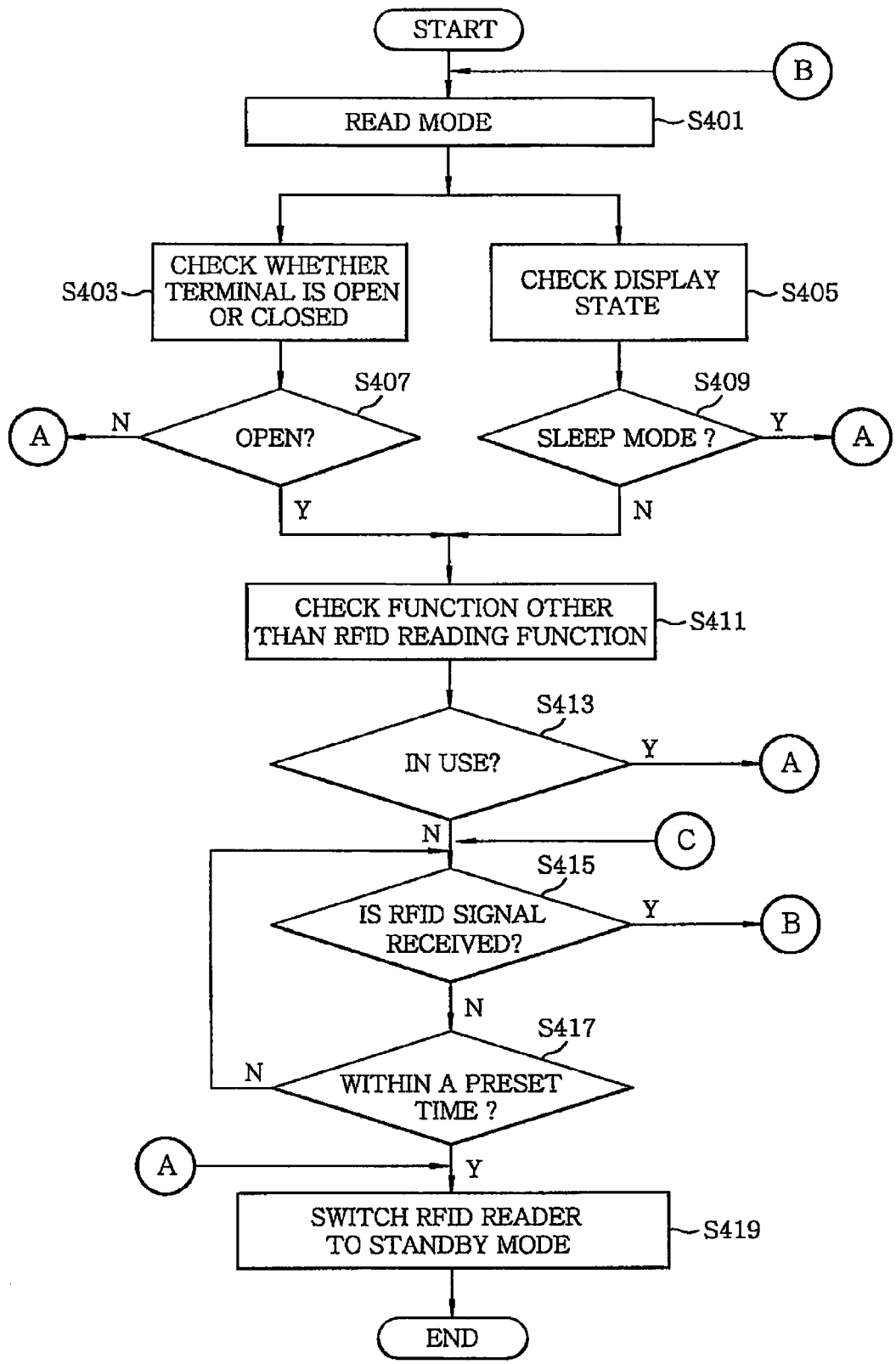
FIGS. 4 and 5 provide flowcharts illustrating a power control method for an RFID reader in accordance with a second embodiment of the present invention.

Referring to FIG. 4, when the RFID reader 204 is in the read mode where power is supplied thereto at step S401, the control block 208 checks the state of the display 216, i.e., the driving mode at step S405.

At the same time, the terminal state detecting block 206 checks whether the folder, flip, or slide of the mobile terminal is open or closed, and notifies the control block 208 of whether the mobile terminal is in the standby mode or in the operation mode based on the result of checking at step S403.

Then, if it is checked that the mobile terminal is in the standby mode where the folder, flip, or slide of the mobile terminal is closed at step S407, or that the mobile terminal is in the sleep mode where the back-light of the display 216 is turned off at step S409, the control block 208 generates an RFID reader power interruption control signal to provide it to the power supply block 210. In response, the power supply block 210 interrupts the supply of power to the RFID reader 204 for reading of the RFID data. Then, the RFID reader 204 is switched from the read mode to the standby mode at step S419.

Moreover, if it is checked that the mobile terminal is in the operation mode where the folder, flip, or slide of the mobile terminal is open, or that the mobile terminal is in the operation mode where the back-light of the display 216 is turned on, the control block 208 checks whether a function other than the RFID reading function is in use or not at steps S411.

If a function other than the RFID reading function is in use at step S413, it is recognized that there is no intention to use the RFID reading function. Hence, the control block 208 generates an RFID reader power interruption control signal to provide it to the power supply block 210. In response, the power supply block 210 interrupts the supply of power being supplied to the RFID reader 204 for reading of RFID data. Then, the RFID reader 204 is switched from the standby mode to the read mode at step S419.

If, however, no function other than the RFID reading function is in use, the control block 208 determines if an RFID signal is received within a preset time while maintaining the read mode of the RFID reader 204 at steps S415 and S417. If an RFID signal is received within the preset time, the read mode of the RFID reader 204 is continuously maintained. However, if no RFID signal is received within the preset time, the supply of power to the RFID reader 204 is interrupted to switch the RFID reader 204 from the read mode to the standby mode at step S419.

Meanwhile, after the RFID reader 204 is switched from the read mode to the standby mode as a result of performing the steps S411 and S413, the control block 208 checks whether the function other than the RFID reading function in use is finished or not to continuously manage the driving mode of the RFID reader 204. This will be discussed below with reference to FIG. 5.

Figure 5:
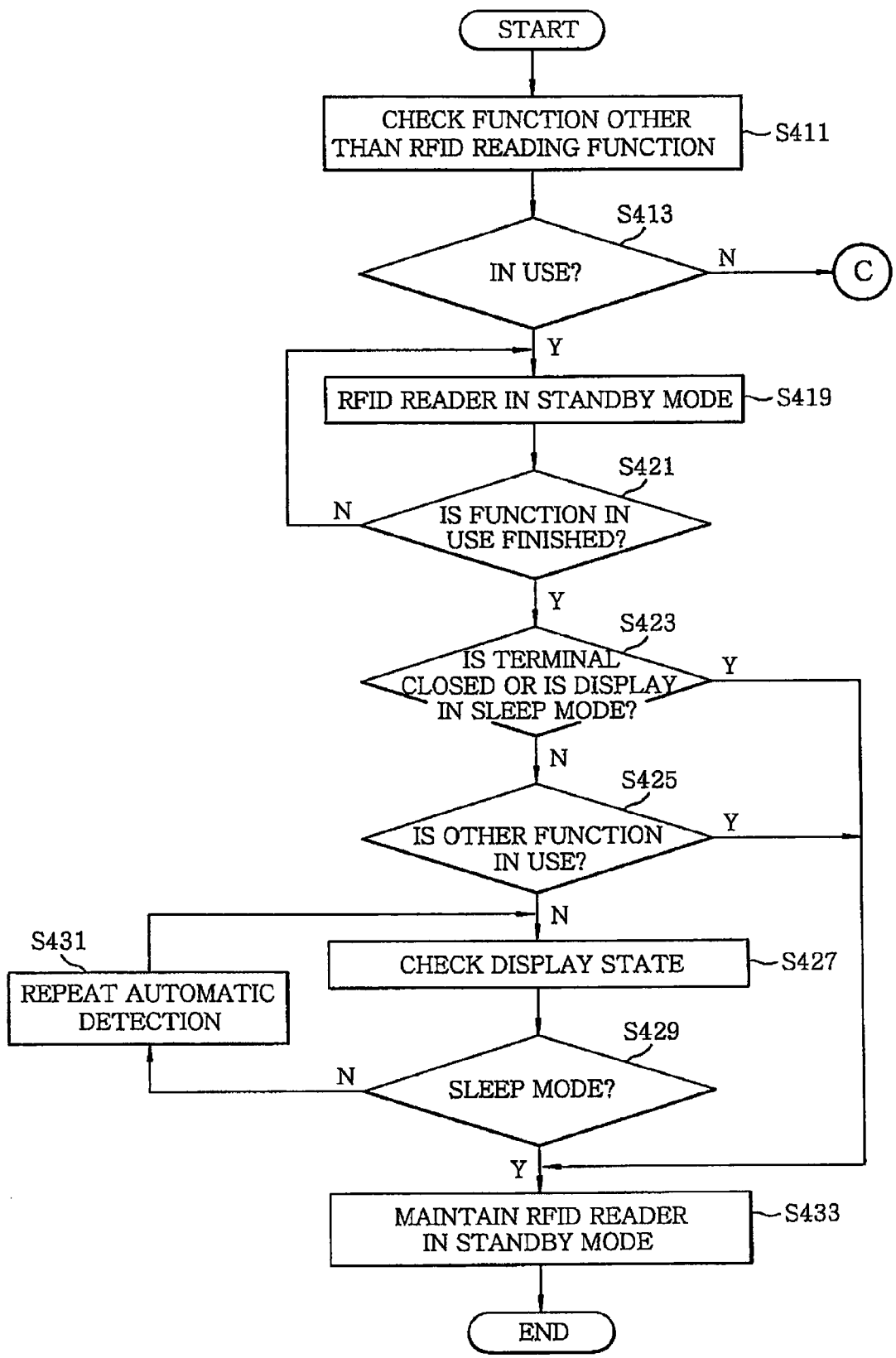

Referring to FIG. 5, in the state where the standby mode of the RFID reader 204 is maintained at steps S411 to S419, the control block 208 checks at step S421 whether the function other than the RFID reading function in use is finished or not.

If it is checked that the function other than the RFID reading function in use is finished, the control block 208 checks the state of the display 216, i.e., the driving mode, and also checks whether the folder, flip, or slide of the mobile terminal is open or not, to determine whether or not the mobile terminal is in the standby mode or in the operation mode at step S423.

As a result of determination, if the display 216 is in the sleep mode or the mobile terminal is in the standby mode where the folder, flip, or slide is closed, the RFID reader 204 is maintained in the standby mode at step S433.

However, if it is determined that the display 216 is in the operation mode or the mobile terminal is in the operation mode, it is determined again at step S425 whether or not a function other than the RFID reading function is in use. Thereafter, if it is determined that no function other than the RFID reading function is in use, the RFID automatic detection is repeatedly performed at steps S427 to S431 until the display 216 is changed to the sleep mode.

Meanwhile, even in case where the RFID signal reading is finished after performing the RFID automatic detection as in step S431, the control block 208 continuously manages the driving mode of the RFID reader 204, which will be described below with reference to FIG. 6.

Figure 6:
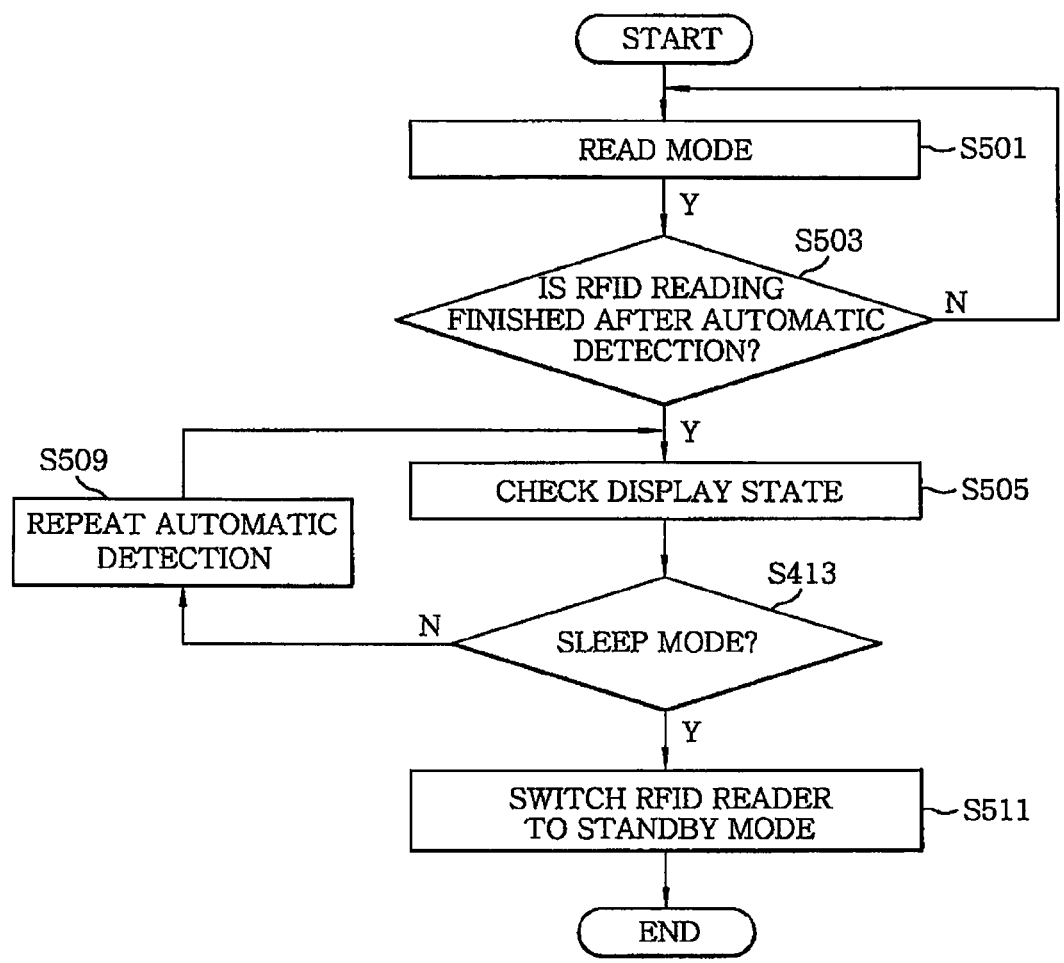
FIG. 6 presents a flowchart illustrating a power supply control method for an RFID reader in accordance with a third embodiment of the present invention.

Referring to FIG. 6, when the RFID reader 204 is maintained in the read mode at step S501, the control block 208 judges at step S503 whether or not the RFID signal reading is finished after performing the RFID automatic detection by the RFID reader 204.

As a result of judgment at step S503, if the RFID signal reading is not finished, the RFID reader 204 is maintained in the read mode. However, if it is judged that the RFID signal reading is finished, the RFID automatic detection is repeatedly performed at steps S505 to S509 until the display 216 is changed to the sleep mode. Thereafter, the RFID reader 204 is switched from the read mode to the standby mode at step S511.

While the invention has been shown and described with respect to the preferred embodiments, it will be understood by those skilled in the art that various changes and modification may be made without departing from the scope of the invention as defined in the following claims.

The invention claimed is:

1. A power control method for an RFID (radio frequency identification) reader in a mobile terminal which includes a display in an activated state or deactivated state by turning the display on or off in response to the supply of power to the display or when power to the display is interrupted, comprising the steps of:
   (a) in a standby mode of the RFID reader when no power is supplied to the RFID reader, checking whether the display is turned on or off;
   (b) if the display is turned off in step (a), maintaining the standby mode of the RFID reader, and if the display is turned on in step (a) further checking an RFID menu interface so as to determine whether an RFID automatic detection function is set in the RFID menu interface;
   (c) if the RFID automatic detection function is not set in the RFID menu interface in step (b), maintaining the RFID reader in the standby mode, and if the RFID automatic detection function is set in the RFID menu interface in step (b), supplying power to the RFID reader so that the RFID reader is switched from the standby mode of the RFID reader to a read mode of the RFID reader;
   (d) after switching to the read mode of the RFID reader in step (c), checking whether the mobile terminal is in a standby mode or in an operation mode;
   (e) if the mobile terminal in step (d) is in the operation mode, determining whether or not a function other than an RFID reading function at the mobile terminal is currently being run;
   (f) if no function other than the RFID reading function at the mobile terminal is currently being run in step (e), judging whether or not an RFID signal is received within a predetermined time while maintaining the RFID reader in the read mode and
   (g) if the RFID signal is received within the predetermined time in step (f). continuously maintaining the RFID reader in the read mode, and if no RFID signal is received within the predetermined time in step (f), interrupting the supply of power to the RFID reader so that the RFID reader is switched from the read mode of the RFID reader to the standby mode of the RFID reader;
   (h) if a function other than the RFID reading function is currently being run in step (e), interrupt the supply of power to the RFID reader so that the RFID reader is switched from the read mode of the RFID reader to the standby mode of the RFID reader;
   (i) when the RFID reader is maintained in the standby mode in step (h), check whether or not the function other than the RFID reading function is finished;
   (j) if the function other than the RFID reading function is finished in step (i), determine whether the display is turned on or off and further checking whether the mobile terminal is in the standby mode or in the operation mode; and
   (k) if the display is turned on or the mobile terminal is in the operation mode of the mobile terminal in step (j), judge whether or not the function other than the RFID reading function is currently being run, and if no function other than the RFID reading function is currently being run, repeatedly perform an RFID automatic detection until the display is turned off;
   (l) judging whether RFID signal reading is finished or not after performing the RFID automatic detection in the step (k);
   (m) if the RFID signal reading is not finished in the step (n), maintaining the RFID reader in the read mode; and
   (n) if the RFID signal reading is finished in the step (n), repeatedly performing the RFID automatic detection until the display is changed to be turned off and then switching the RFID reader from the read mode to the standby mode.

2. The method of claim 1, further comprising the steps of:
   (o) if the display is turned off or the mobile terminal is in the standby mode in the step (d), interrupting the supply of power to the RFID reader so that the RFID reader is switched from the read mode of the RFID reader to the standby mode of the RFID reader.

3. The method of claim 2, further comprising the steps of:
(p) if the display is turned off or the mobile terminal is in the standby mode in the step (j), maintaining the RFID reader in the standby mode of the RFID reader.

4. A power control method for an RFID (radio frequency identification) reader in a mobile terminal having a display and a driving mode with the display and/or mobile terminal in either a sleep mode or an operation mode, said method comprising the steps of:
   in a standby mode of the RFID reader if no power is being supplied to the RFID reader, checking the display to determine first whether to maintain the standby mode of the RFID reader,
   if the display is turned off maintaining the standby mode of the RFID reader;
   if the display is turned on checking second an RFID menu interface so as to determine whether an RFID automatic detection function is set in the RFID menu interface;
   if the RFID automatic detection function is not set in the RFID menu interface, maintaining the standby mode of the RFID reader;
   if the RFID automatic detection function is set in the RFID menu interface, switching the RFID reader from the standby mode to a read mode in which mode power is supplied to the RFID reader;
   after switching to the read mode of the RFID reader, checking whether the mobile terminal is in a standby mode or in an operation mode;
   if the mobile terminal is in the operation mode, determining whether or not a function other than an RFID reading function at the mobile terminal is currently being run;
      if a function other than the RFID reading function is currently being run at the mobile terminal, interrupting the supply of power to the RFID reader so that the RFID reader is switched from the read mode of the RFID reader to the standby mode of the RFID reader;
   when the RFID reader is maintained in the standby mode, checking whether or not the function other than the RFID reading function is finished;
   if the function other than the RFID reading function is finished, determining whether the display is turned on or turned off and further checking whether the mobile terminal is in the standby mode or in the operation mode;

if the display is turned on or the mobile terminal is in the operation mode of the mobile terminal, judging whether or not the function other than the RFID reading function is currently being run, and if no function other than the RFID reading function is currently being run, repeatedly performing an RFID automatic detection until the display is turned off;

judging whether RFID signal reading is finished or not after performing the RFID automatic detection;

if the RFID signal reading is not finished, maintaining the RFID reader in the read mode;

and if the RFID signal reading is finished, repeatedly performing the RFID automatic detection until the display is changed to be turned off and then switching the RFID reader from the read mode to the standby mode.

\* \* \* \* \*